United States Patent [19]

Weisenberger

[11] 4,114,845
[45] Sep. 19, 1978

[54] SUPPORT APPARATUS BEING ADJUSTABLE AS TO HEIGHT AND INSULATING VIBRATIONS FOR MACHINES AND THE LIKE

[75] Inventor: Gottfried Weisenberger, Mainz, Germany

[73] Assignee: Effbe-Werk Fritz Brumme & Co. K.G., Raunheim, Germany

[21] Appl. No.: 791,490

[22] Filed: Apr. 27, 1977

[30] Foreign Application Priority Data

May 7, 1976 [DE] Fed. Rep. of Germany ....... 2620162

[51] Int. Cl.$^2$ ............................................ F16M 13/00
[52] U.S. Cl. ..................................... 248/24; 248/188.2
[58] Field of Search ...................... 248/23, 24, 22, 350, 248/188.2, 188.4; 254/104

[56] References Cited

U.S. PATENT DOCUMENTS 2,819,037 1/1958 Wilkin ........................... 248/188.2 X

FOREIGN PATENT DOCUMENTS

| | | | |
|---|---|---|---|
| 102,589 | 11/1937 | Australia ..................................... | 248/23 |
| 664,570 | 9/1929 | France ......................................... | 248/23 |
| 2,426,284 | 1/1975 | Fed. Rep. of Germany ............. | 248/24 |
| 1,142,044 | 2/1969 | United Kingdom ....................... | 248/23 |

Primary Examiner—J. Franklin Foss
Attorney, Agent, or Firm—Wayne B. Easton

[57] ABSTRACT

The invention relates to mounting apparatus for adjustingly and insulatingly supporting various types of rotatable and vibratable machinery. The apparatus includes a base member and a vertically movable support member, both of which members have inclined surfaces in diverging pairs between which are disposed two wedge shaped members. A screw arrangement having right and left hand threads engage the two wedge shaped members to move them toward and away from each other in unison to raise and lower the vertically movable support member. Between the wedge shaped members and the base member on the bottom and the support member on the top are resilient elements which provide cushioning for the upper support member. The resilient elements may be attachable to the wedge shaped members and slide relative to the other member or may be attachable to all of the members. In the latter case the resilient members are somewhat thicker because in the absence of relative sliding the relative movement between the members must be accommodated by the relative displacement between the upper and lower portions of each resilient member.

8 Claims, 6 Drawing Figures

SUPPORT APPARATUS BEING ADJUSTABLE AS TO HEIGHT AND INSULATING VIBRATIONS FOR MACHINES AND THE LIKE

The invention relates to machinery support apparatus which is adjustable as to height and provides vibration insulation. The support apparatus includes at least one resilient element and support elements which are superimposedly arranged and oppositely adjustable to one another horizontally by means of a screw. These elements have at least one pair of wedge surfaces which inclined to the horizontal.

In this apparatus the wedge surfaces do not have sliding contact with each other no longer need to slide with metal to metal contact but instead are separated by a resilient element. Surface roughness and angular faults are not significant and hence only a very simple machining or no machining at all is required. The support elements can be non-machined castings which makes production very economical.

In an embodiment herein wherein the resilient elements are attached to both sides of the support elements, the entire horizontal displacement is accommodated by the resilient element. It is preferrable, however, that the resilient element freely rests on the wedge surface of the other support element. That is, the horizontal displacement can then be accommodated entirely or partly by a sliding movement between the wedge surface and the resilient element. Most resilient materials, in particular synthetic or natural rubber, do have surfaces that are capable of sliding relatively well even on a rough wedge surface. If need be, this sliding capability can be improved by adding materials or by the application of a sliding agent such as oil or a lubricator between wedge surface and resilient element.

The attaching of the resilient element on a wedge surface, or on two wedge surfaces, can be effected by means of adhesion. It may be simpler, however, to attach the resilient element by placing it in a recess in the wedge surface of the one support element. Such a recess can be provided very simply in a casting.

In a particularly preferred embodiment of the invention two central support elements have wedge surfaces above and below which converge towards the vertical central plane and cooperate with respective wedge surfaces on the upper and lower support elements. The two central support elements are adjustable by means of a screw which engages one central support element with a right-hand thread and the other central support element with a left-hand thread. With this apparatus no horizontal movement of the upper support element takes place relative to the lower support element during an adjustment and the set screw also does not undergo any horizontal movement. The symmetrical structure provides a uniform loading and horizontal force components extending in the screw are well accommodated, it being immaterials how they are directed. Although this embodiment does have an increased number of wedge surfaces, this is not important to production costs because machining operations are not required.

It is also an advantage that the upper support element is formed as a hood and partly surrounds the other support elements by its circumferentially extending wall. This wall has a slot which accommodates the adjusting screw. The hood is lifted and lowered during the adjustment and it protects the interior parts as well as providing an attractive appearance.

Each pair of wedge surfaces is advantageously arranged symmetrically relative to the screw axis. This results in a compact type of structure in which the tapholes and the space for the two central support elements do not interfere with each other.

Adjacent the screw head there is advantageously provided a thread section of the one direction of rotation with a larger diameter than the thread section at the far end of the screw having other direction of rotation. In this way it is possible to introduce the screw from the same side into the two central support elements. If both threaded sections were to have the same diameter, it would be necessary to subsequently add the screw head by welding or to use a head with inner and outer polygonals which do not exceed the thread diameter.

If an increased stability against horizontal force components extending transversely to the screw axis is desired, the wedge surface of the other support element can be formed at the base of a groove extending in the setting direction. The groove walls prevent a lateral sliding of the resilient element without influencing the desired sliding movement.

Wedge surfaces of the support elements can also be provided which are inclined in the transverse direction as well as the longitudinal direction. This prevents a transverse sliding of the resilient elements without influencing the desired sliding movement.

It is advantageous if the wedge surfaces on which the resilient element is freely resting are aluminum castings. Aluminum castings can be produced with relatively smooth surfaces which are conducive to good slideability. The support elements to which the resilient elements are attached can be steel castings.

It has been determined that with a single sided attaching of the resilient element, the angle of the wedge surface with respect to the horizontal should be 10° to 20°, preferably about 15°. With two superimposed pairs of such wedge surfaces this results in a wedge angle of 20° to 40°, preferably about 30°. The horizontal adjustment required for a predetermined height adjustment is accommodated by the sliding movement between the resilient elements and the wedge surfaces.

With a double sided attaching of the resilient elements the angle of the wedge surface with respect to the horizontal should be 20° to 40°, preferably about 30°. With two pairs of superimposed wedge surfaces this results in a wedge angle of 40° to 80°, preferably about 60°. This larger wedge angle permits shorter horizontal displacements for a desired change of height and tests have shown that wedge angles of 90° and up to 120° can be used. In this embodiment it is desirable to select the height of the resilient element larger than 20 mm. Compared with thinner resilient elements it is possible to accommodate larger transverse displacements.

The upper and lower support elements are advantageously kept together by means of a spring. This spring insures that the parts maintain their relative positions during transport and the mounting operation. After the mounting operation the spring forces can be neglected with respect to the machine weight.

A main object of the invention is to provide new and improved machinery mounting apparatus of the type referred to above which operates efficiently and can be produced economically.

Other objects and advantages of the invention will become apparent from the following specification, drawings and appended claims.

Figure 1:
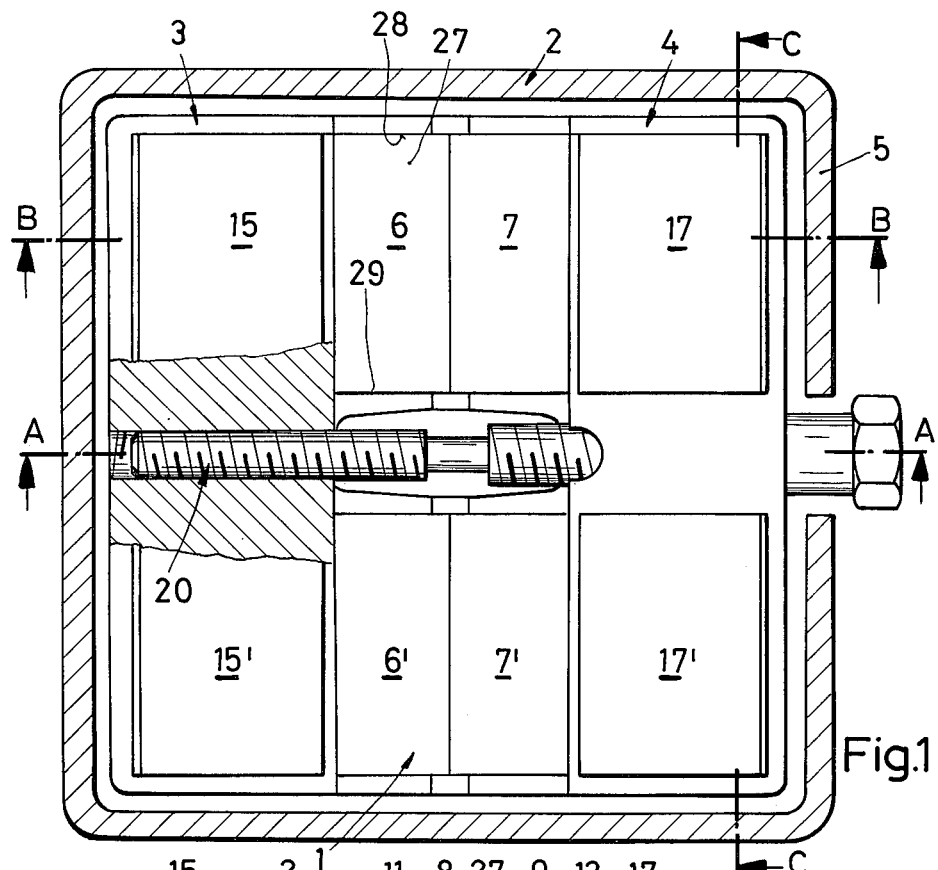
FIG. 1 is a sectional plan view of support apparatus embodying the invention.
Figure 3:
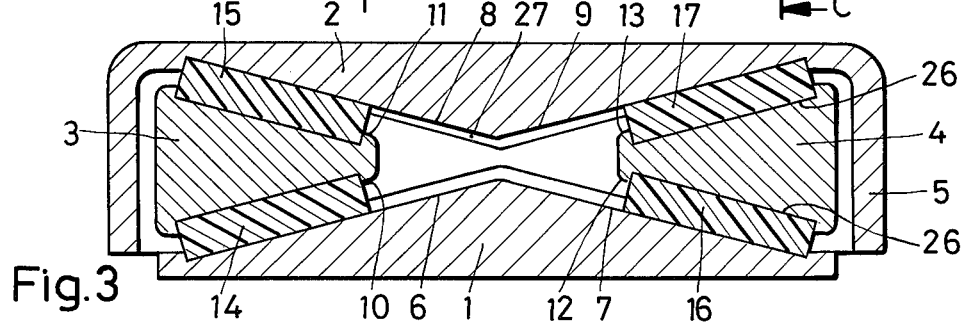
FIG. 3 is a vertical sectional view taken on line B—B of FIG. 1.
Figure 2:
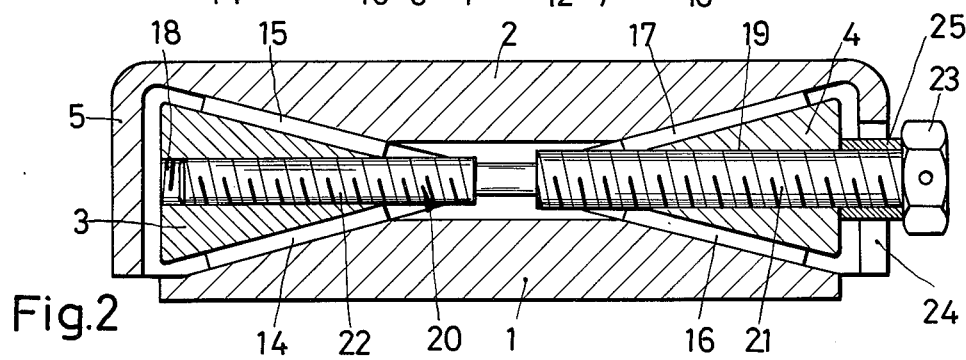
FIG. 2 is a vertical sectional view taken on line A—A of FIG. 1.

The embodiment in FIGS. 1 to 4 has a lower base element 1, an upper support element 2 and two central wedge shaped support elements 3 and 4. The upper support element 2 forms a hood 5 surrounding the remaining parts. The lower base element 1 has two inclined surfaces 6 and 7 which extend downwardly from the apex thereof. The upper support element 2 has two inclined surfaces 8 and 9 which extend upwardly from the apex thereof. The central support element 3 has a lower inclined surface 10 and an upper inclined surface 11. The central support element 4 has a lower inclined surface 12 and an upper inclined surface 13. A first rectangularly shaped resilient element 14 is between the pair of inclined or wedge surfaces 6 and 10 and a second rectangularly shaped resilient element 15 is between the pair of inclined or wedge surfaces 8 and 11. A third rectangularly shaped resilient element 16 is between the pair of inclined or wedge surfaces 7 and 12 and a fourth rectangularly shaped resilient element 17 is between the pair of inclined or wedge surfaces 9 and 13.

The wedge surfaces and resilient elements referred to are disposed on one side of section line A—A. A corresponding set is located on the other side of this section line with the corresponding elements having the same reference numerals distinguished with prime marks.

The central support elements 3 and 4 have aligned tapholes 18 and 19 which are engaged by a screw having a first section 21 with a left-hand thread and a second section 22 with a right-hand thread. Section 21 adjacent screw head 23 has a larger diameter than section 22 on the other end. This screw extends through a slot 24 in the skirt of hood 5. A sleeve 25 is fastened to head 23 and thereby forms an end stop for the central support element 4.

The resilient elements are attached to the central support elements 3 and 4. This is effected by recesses 26 in the wedge surfaces 10, 11, 12 and 13. The wedge surfaces 6, 7, 8 and 9 are bounded by grooves 27 in the walls 28 and 29 to prevent lateral displacement of the resilient elements. However, a sliding of the resilient elements on wedge surfaces 6, 7, 8 and 9 is permitted.

The wedge surfaces each form an angle of 15° with respect to a horizontal plane. The lower support or base element 1 and the upper support element 2 are made of aluminum castings and the central support elements 3 and 4 are made of steel castings. A subsequent machining, in particular a chip-removing machining of the wedge surfaces, is not required because all the grooves and recesses are formed by the mold. At the turning of screw 20 the central support elements 3 and 4 are moved toward or away from each other whereby the resilient elements 14, 15, 16 and 17 slide on wedge surfaces 6, 7, 8 and 9. In this way the level of the upper support element 2 is changed. The vibration insulation is effected by means of the flexible elements which at the same time serve as slide elements.

Figure 5:
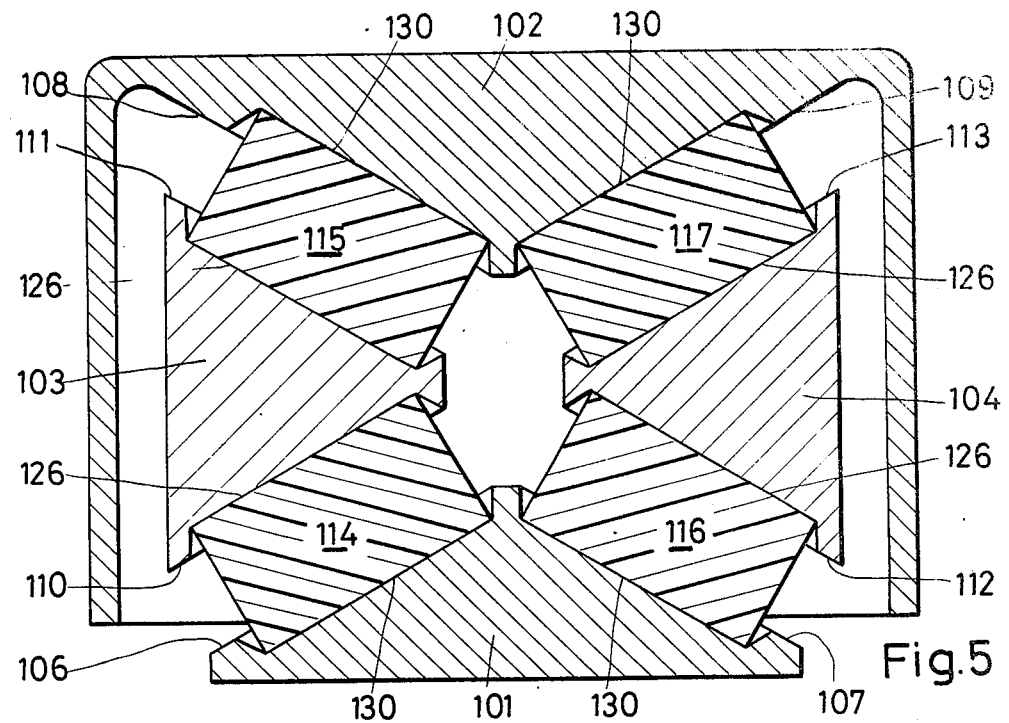
FIG. 5 is a vertical sectional view similar to FIG. 3 of a second embodiment of the invention.
Figure 4:
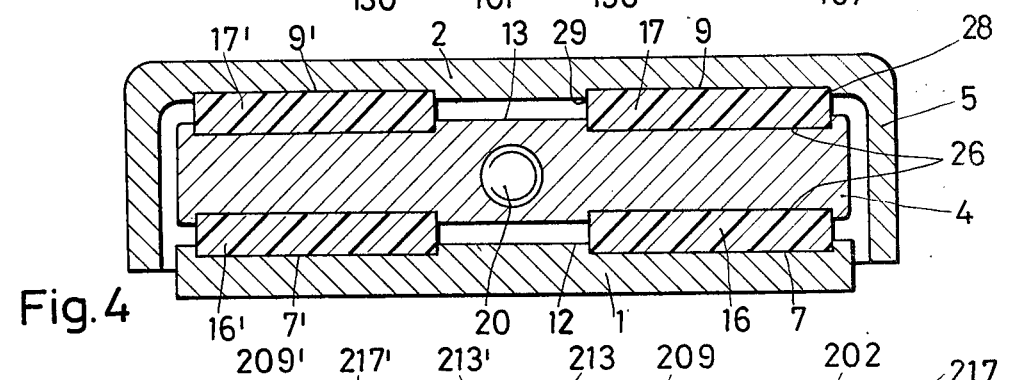
FIG. 4 is a vertical sectional view taken on line C—C of FIG. 1.

In the embodiment shown in FIG. 5 reference numerals used for the corresponding elements are increased by 100. In this embodiment the resilient elements 114, 115, 116 and 117 are not only attached to the wedge surfaces 110, 111, 112 and 113 of the central support elements 103 and 104 but are also attached to wedge surfaces 106, 107, 108 and 109 of the lower support or base element 101 and the upper support element 102. When the central support elements 103 and 104 are moved towards and away from each other by means of the screw, as in FIG. 1, the horizontal movement is accommodated by a deformation of the resilient elements. For this reason the resilient elements are somewhat thicker than those of the embodiment of FIG. 1. The height may be 25 mm and all the wedge surfaces extend at an angle of 30° with respect to the horizontal. Such a wedge angle permits a sufficient height adjustment even without a sliding movement of the resilient elements.

Figure 6:
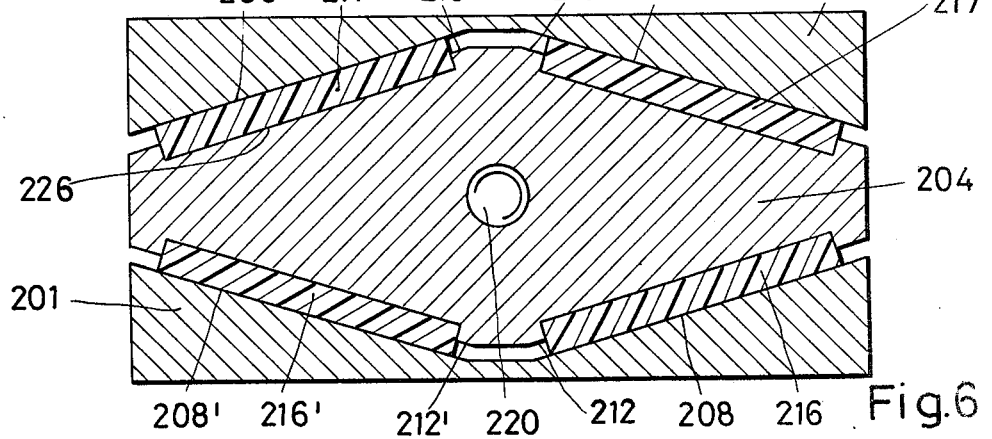
FIG. 6 is a vertical view similar to FIG. 4 of a second embodiment of the invention.

In the embodiment shown in FIG. 6 reference numerals used for the corresponding elements are increased by 200. This embodiment distinguishes over that in FIG. 4 substantially in that the upper support element 202 does not form a hood and that the resilient elements 216, 217, 216' and 217' are also inclined transversely relative to the axis of screw 220. Hence, the respective wedge surfaces have inclinations corresponding to FIG. 3 in a section parallel to the screw axis, and inclinations transversely thereto as illustrated in FIG. 6. Because of this double inclination, and because of the symmetrical arrangements of the parts, it is possible to absorb all of the horizontal forces even though the stability of the resilient elements in transverse directions is substantially less as compared with the stability in the longitudinal direction parallel to the screw axis.

The individual parts can be retained together by means of a spring (not shown) which engages the upper and lower support elements. When being mounted, the support apparatus is placed below a machine and subsequently the machine is levelled by means of the adjusting screw.

I claim:

1. An adjustable height support unit, comprising, a casted base member having unmachined surfaces meeting to form an apex and extending downwardly therefrom in a longitudinal direction, a casted support member having unmachined surfaces meeting to form an apex and extending upwardly therefrom in a longitudinal direction, a pair of casted wedge members between said members and having surfaces in respective juxtaposition and parallel relation to said base member and support member unmachined surfaces, resilient elements respectively between juxtapositioned pairs of said surfaces, one side of which is attached to one surface of each of said pairs and the other side of which is slidably resting on the other surface of each of said pairs, and motive means for forcibly moving said wedge members in opposite direction in unison to raise and lower said support member relative to said base member.

2. An adjustable height support unit according to claim 1 wherein one surface of each of said pairs of juxtapositioned surfaces is recessed for receiving and retaining one of said resilient elements.

3. An adjustable height support unit according to claim 1 wherein said motive means includes a screw member with right and left hand thread sections respectively engaging said wedge members.

4. An adjustable height support unit according to claim 1 wherein said support member is provided with said other surface of said pair and includes a surrounding shroud section, said shroud having an opening for access to said motive means.

5. An adjustable height support unit according to claim 3 wherein said screw member has a sleeve attached adjacent the head thereof for limiting movement of the adjacent one of said wedge members.

6. An adjustable height support unit according to claim 1 wherein all of said surfaces extend normal to a vertical plane.

7. An adjustable height support unit according to claim 1 wherein all of said surfaces form angles of approximately 15 degrees relative to a horizontal plane.

8. An adjustable height support unit according to claim 1 wherein said base member surfaces extend downwardly from the apex thereof in a lateral direction, and said support member surfaces extend upwardly from the apex thereof in a lateral direction.

* * * * *